(12) United States Patent
Akif et al.

(10) Patent No.: US 12,325,296 B2
(45) Date of Patent: Jun. 10, 2025

(54) AIR FLAP FOR VEHICLE FRONT

(71) Applicant: Bayerische Motoren Werke Aktiengesellschaft, Munich (DE)

(72) Inventors: Oeztzan Akif, Munich (DE); Christian Hack, Schweitenkirchen (DE); Arne Koehler, Pliening (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 266 days.

(21) Appl. No.: 17/914,816

(22) PCT Filed: Jun. 1, 2021

(86) PCT No.: PCT/EP2021/064667
§ 371 (c)(1),
(2) Date: Sep. 27, 2022

(87) PCT Pub. No.: WO2021/245076
PCT Pub. Date: Dec. 9, 2021

(65) Prior Publication Data
US 2023/0132507 A1    May 4, 2023

(30) Foreign Application Priority Data

Jun. 3, 2020   (DE) ..................... 10 2020 114 768.6

(51) Int. Cl.
*B60K 11/08*    (2006.01)
(52) U.S. Cl.
CPC .................. *B60K 11/085* (2013.01)
(58) Field of Classification Search
CPC ................... F02F 3/28; F02F 3/0084
See application file for complete search history.

(56) References Cited

U.S. PATENT DOCUMENTS

| 6,354,096 B1 | 3/2002 | Siler et al. |
| 11,731,503 B2 * | 8/2023 | Guyon ................ B60K 11/085 180/68.1 |

(Continued)

FOREIGN PATENT DOCUMENTS

| CN | 1350112 A | 5/2002 |
| CN | 101302914 A | 11/2008 |

(Continued)

OTHER PUBLICATIONS

International Search Report (PCT/ISA/210) issued in PCT Application No. PCT/EP2021/064667 dated Aug. 25, 2021 with English translation (four (4) pages).

(Continued)

*Primary Examiner* — Kurt Philip Liethen
(74) *Attorney, Agent, or Firm* — Crowell & Moring LLP

(57) ABSTRACT

An air flap for an air flap assembly for a vehicle front is provided. The air flap has a front face and a lateral face having a slotted guide system. The air flap blocks an air inlet in the vehicle front through the front face in a closed position and opens the air inlet in an open position. The air flap is rotatable from the closed position into the open position by a rotary movement about an axis of rotation by way of a driver of an actuator, which driver can be guided in the slotted guide system. The slotted guide system located on the lateral face of the air flap has a tapered portion, so that the slotted guide system and the driver have substantially no play in relation to one another in the region of the tapered portion.

11 Claims, 3 Drawing Sheets

(56) References Cited

U.S. PATENT DOCUMENTS

| | | | |
|---|---|---|---|
| 2008/0276538 A1 | 11/2008 | Costigan | |
| 2012/0225617 A1* | 9/2012 | Voigt | B60H 1/3421 |
| | | | 454/155 |
| 2014/0076646 A1* | 3/2014 | Povinelli | B60K 11/06 |
| | | | 180/68.1 |
| 2014/0090610 A1* | 4/2014 | Higuchi | B60K 11/085 |
| | | | 123/41.58 |
| 2016/0102599 A1 | 4/2016 | Danev et al. | |
| 2017/0021720 A1* | 1/2017 | Anderson | B60K 11/085 |
| 2020/0269679 A1* | 8/2020 | Guyon | B60H 1/242 |
| 2022/0371430 A1* | 11/2022 | Schneider | B60K 11/085 |

FOREIGN PATENT DOCUMENTS

| | | |
|---|---|---|
| CN | 105508018 A | 4/2016 |
| CN | 109682050 A | 4/2019 |
| DE | 10 2012 211 774 A1 | 1/2014 |
| DE | 10 2015 109 229 A1 | 12/2016 |
| DE | 10 2015 221 003 A1 | 4/2017 |
| DE | 10 2016 224 846 A1 | 6/2018 |
| EP | 2 098 400 A2 | 9/2009 |
| FR | 2 738 779 A1 | 3/1997 |
| FR | 3 076 772 A1 | 7/2019 |
| JP | 2003-25224 A | 2/2003 |
| KR | 10-2017-0124123 A | 11/2017 |
| WO | WO 2011/098381 A1 | 8/2011 |
| WO | WO 2019/138169 A1 | 7/2019 |

OTHER PUBLICATIONS

German-language Written Opinion (PCT/ISA/237) issued in PCT Application No. PCT/EP2021/064667 dated Aug. 25, 2021 (seven (7) pages).

German-language Search Report issued in German Application No. 10 2020 114 768.6 dated Apr. 28, 2022 with partial English translation (11 pages).

English translation of Chinese-language Office Action issued in Chinese Application No. 202180028917.0 dated Feb. 28, 2025 (10 pages).

* cited by examiner

AIR FLAP FOR VEHICLE FRONT

BACKGROUND AND SUMMARY

The present invention relates to an air flap for an air flap arrangement of a vehicle front, to an actuator for an air flap, and to a system with an air flap and an actuator.

Air flaps and air flap arrangements in general are known from the prior art.

Thus, for example, DE 10 2016 224 846 A1 discloses an air flap system for controlling the admission of air into a motor vehicle. The air flap system comprises an actuating drive, and at least one group of air flaps, of which each is arranged such that it can be pivoted between an open position and a closed position, is loaded by means of a spring in a first rotational direction, and can be pivoted by the actuating drive counter to the spring loading in a second rotational direction which is opposed to the first rotational direction.

A distinction is to be made fundamentally here between two systems of air flaps. In the case of the first system, an air flap which can be rotated substantially about a vehicle width direction is provided, in order to completely close an air inlet or an engine compartment in the vehicle vertical direction on the vehicle front.

In the case of the other systems, an air flap is provided which is mounted such that it can be rotated substantially about a vehicle width direction, in order to be moved from a closed into an open position.

The present invention relates to the first systems. Here, an air flap of this type has at least two positions. In a closed position, it blocks an air inlet for an engine compartment on the vehicle front and, in an open position, it releases the air inlet. The air flap can be rotated from the closed position into the open position by way of a rotational movement about a pivot pin by means of an actuator which can be connected to the pivot pin.

In the closed position of the air flap, air which flows onto the vehicle front during driving operation does not flow into an engine compartment which is situated behind the vehicle front in the vehicle longitudinal direction.

As a result, a drag coefficient of the vehicle is reduced in comparison with an open position, in the case of which the oncoming air is conducted into the engine compartment in order to cool an engine.

In the case of modern vehicles, however, the air flap which is described at the outset also has to be capable of moving to intermediate positions, that is to say positions between the closed and the open position.

That is to say, the air flap is moved not only into the completely open or completely closed states, but rather, for example, also has to be capable of being moved to the 10% open state and of being held there.

In this opening state (for example, 10%) of the air flap, undesired vibrations of the air flap can occur due to the flow and as a result of the tolerance range of the bearing systems of air flaps in air flap controllers.

It is therefore an object of the invention to provide a system which is configured, inter alia, to overcome these disadvantages from the prior art, in particular to provide an air flap which reduces the tolerance range in the drive of the air flaps.

According to the invention, this object is achieved by way of the features of the independent claims. Advantageous refinements are specified in the subclaims.

Accordingly, the object is achieved by way of an air flap for an air flap arrangement of a vehicle front. The air flap has a front surface and a side surface with a slotted guide. The air flap blocks an air inlet of the vehicle front by way of the front surface in a closed position and releases the air inlet in an open position. It is possible for the air flap to be rotated from the closed position into the open position by way of a rotational movement about a pivot pin by means of a driver of an actuator, which driver can be guided in the slotted guide. The slotted guide which is arranged on the side surface of the air flap has a tapered portion, with the result that the slotted guide and the driver have substantially no play with respect to one another in the region of the tapered portion.

The tapered portion can also be called a constriction. The tapered portion can extend in a region of a predefined length between two ends of the slotted guide which are spaced apart from one another in the vehicle longitudinal direction. A length of the tapered portion can correspond to the region of the slotted guide.

In the region of the tapered portion, the height of the slotted guide can decrease in comparison with the remaining slotted guide. Here, a dimension, in particular an internal dimension, of the slotted guide can decrease in the width direction of the slotted guide.

It is contemplated that the slotted guide is configured as a through hole in the side surface of the air flap.

The driver can be fixed in the region of the tapered portion by virtue of the fact that, in the case of the above-described air flap, the slotted guide which is arranged on the side surface of the air flap has a tapered portion in such a form that the slotted guide and the driver have substantially no play with respect to one another in the region of the tapered portion.

More precisely, a pressure force can be exerted on the driver by the slotted guide. In a manner which is dependent on the respective materials of the driver and the side surface of the air flap, this pressure force generates a frictional force of a defined magnitude between the driver and the slotted guide. The frictional force and the pressure force fixed the driver in the region of the tapered portion on the slotted guide of the air flap.

Undesired vibrations, brought about, inter alia, by way of air which flows onto the air flap and by way of a tolerance range of bearing systems of air flaps, in particular in intermediate positions of the air flap which are situated between the open and the closed position of the air flap, can be avoided by way of the fixing of the driver on the air flap.

The side surface of the air flap can be of resilient configuration in the region of the tapered portion.

The resilient region in or on the slotted guide can achieve a situation where the air flap is mounted fixedly or without play in the intermediate region of the slotted guide, such that fluttering of the air flap/flaps can be counteracted in this way in intermediate positions of the air flap/flaps even at high vehicle speeds.

Resilient can mean in the present case that the side surface of the air flap permits an elastic deformation in the region of the tapered portion of the slotted guide to such an extent as is necessary, in order that the driver, which is of rigid configuration and, as a result, substantially does not deform, can pass the tapered portion in the slotted guide.

In other words, in the case of the resilient embodiment, the tapered portion can have a smaller internal dimension than an external dimension of the driver.

When the air flap is rotated about its pivot pin, the driver can slide in the slotted guide into the region of the tapered portion.

As a result of the resilient embodiment of this region, the driver, having passed into the region of the tapered portion, can press the slotted guide to the side and can slide through the region of the tapered portion.

When the driver leaves the region of the tapered portion, the latter returns again to its initial dimension, that is to say to the above-described internal dimension.

The side surface of the air flap can have a recess in the region of the tapered portion, with the result that the side surface of the air flap is of resilient configuration in the region of the tapered portion.

The recess can be configured, for example, as a through hole.

It is contemplated that the recess is configured in a region which is arranged spaced apart from the region of the tapered portion in such a way that the wall is configured between the recess and the tapered portion.

As described above, "resiliently configured" can mean in the present case that the side surface of the air flap permits an elastic deformation at least in the region of the tapered portion of the slotted guide to such an extent as is necessary, in order that the driver which is of rigid configuration and, as a result, substantially does not deform can pass the tapered portion in the slotted guide.

If the above-described wall is then configured between the tapered portion and the recess and if the tapered portion has a smaller internal dimension or initial dimension than an external dimension of the driver, the driver, if it is situated in the region of the tapered portion, can press the wall outward into the recess.

The driver can thus slide in the slotted guide through the region of the tapered portion.

When the driver leaves the region of the tapered portion, the wall can move from the recess back into the slotted guide, on account of an elasticity of material which forms the wall, that is to say can be reset in such a way that the tapered portion has its initial dimension again.

Depending on the selection of the materials in the region of the tapered portion and, in particular, the wall, a spring force which acts on the driver can be set. It is to be noted here that a relatively high spring force avoids vibrations in the system more reliably than a comparatively small spring force, but also leads to it being necessary for the actuator to apply greater forces, in order to move the driver through the region of the tapered portion.

The spring force should therefore be selected in such a way that, although there is sufficient fixing of the driver on the air flap by way of the tapered portion and therefore undesired vibrations, brought about, inter alia, by way of air which flows onto the air flap and as a result of a tolerance range of bearing systems of air flaps, in particular in intermediate positions of the air flap, can be avoided, an excessively large or powerful actuator is not required for this purpose.

The slotted guide can have a first end stop for the driver in a first region which adjoins the tapered portion and in which the driver can be arranged in the closed position and the open position.

The slotted guide can have a second end stop for the driver in a second region which adjoins the tapered portion and in which the driver can be arranged in a position, in which the air flap is substantially half open.

As a result of the provision of the first and/or second end stop, the actuator can move the driver into predefined positions, in which the actuator is fixed in the slotted guide.

Contact does not necessarily have to be made with the end stops here. It is conceivable here that the air flap as a rule moves into an end stop which acts on the air flap. The slotted guide can still be open there, however, in order not to be overstressed or to clamp prematurely.

The second end stop for the driver can be arranged further away from the pivot pin than the first end stop, and the tapered portion can extend from the first to the second end stop.

If the tapered portion is situated between the two end stops, fixing of the driver can be achieved over the entire length of the slotted guide, with the result that the air flap can be moved substantially into any position on the movement path from the closed into the open position and can be held there substantially without vibrations.

The pivot pin can run substantially in the vehicle width direction.

The rotational movement, in order to move the air flap from the closed into the open position, can comprise a rotation of the air flap upward in the vehicle vertical direction about the pivot pin which runs in the vehicle width direction.

In the closed position of the air flap, the pivot pin of the air flap can then be arranged at a rear end (in the vehicle longitudinal direction) of the side surface of the air flap. The front side of the air flap can then be a surface which terminates the air flap toward the front in the vehicle longitudinal direction and, in particular, is curved. An air flap of this type can be called paddle-shaped.

Furthermore, an actuator with the driver is provided. The driver is configured to be guided in the slotted guide which is arranged on the side surface of an air flap, in particular of the above-described air flap having the tapered portion. The driver is of resilient configuration.

As described above, the side surface of the air flap can be of resilient configuration at least in the region of the tapered portion of the slotted guide.

In addition or as an alternative, it is possible for the driver to be of resilient configuration. Resilient in relation to the driver can mean in the present case that it permits an elastic deformation to such an extent as is necessary, in order that the driver can pass the tapered portion in the slotted guide.

Fixing of the driver in the slotted guide, in particular in the region of the tapered portion, can be achieved by way of the resilient configuration of the driver.

The description above with respect to the air flap also applies mutatis mutandis to the actuator, and vice versa.

Furthermore, a system having the above-described air flap and an actuator, in particular the above-described actuator, is provided. The actuator has a driver which is guided in the slotted guide which is arranged on the side surface of the air flap and has the tapered portion. The actuator is configured to rotate the air flap from the closed position into the open position and into at least one intermediate position of the air flap situated between the closed and the open position by way of a rotational movement about the pivot pin of this air flap by means of the driver which is guided in the slotted guide. The driver is situated in the at least one intermediate position of the air flap in that region of the tapered portion of the slotted guide, in which the driver and the slotted guide have substantially no play with respect to one another.

The description above with respect to the air flap and with respect to the actuator also applies mutatis mutandis to the system, and vice versa.

Furthermore, a vehicle front having the above-described system can be provided.

The vehicle front is a region of the vehicle which is arranged in front of the drive unit of the vehicle, in particular of a motor, in the vehicle longitudinal direction.

The description above with respect to the air flap, with respect to the actuator and with respect to the system also applies mutatis mutandis to the vehicle front, and vice versa.

Furthermore, a vehicle having the above-described vehicle front can be provided. The vehicle can be a motor vehicle, in particular a passenger car. The vehicle can have a drive unit, it being possible for the drive unit to be, in particular, an internal combustion engine.

The description above with respect to the air flap, with respect to the actuator, with respect to the system and with respect to the vehicle front also applies mutatis mutandis to the vehicle, and vice versa.

Finally, an actuator for an air flap of an air flap arrangement of a vehicle front is provided. The air flap has a front surface and a side surface with a driver. The air flap blocks an air inlet of the vehicle front by way of the front surface in a closed position and releases the air inlet in an open position.

It is possible for the actuator to be connected to the air flap by means of a connecting element with a slotted guide, in which the driver can be guided, in such a way that the air flap can be rotated from the closed position into the open position by way of a rotational movement about a pivot pin.

The slotted guide which is arranged on the connecting element of the actuator has a tapered portion, with the result that the slotted guide and the driver have substantially no play with respect to one another in the region of the tapered portion.

That is to say, the slotted guide which is described above in relation to the air flap can also be provided on the actuator side instead of in the air flap. The air flap would then have a drive which can be guided in the guide of the actuator.

In this way, the same advantages can be achieved as described above with reference to the air flap. In addition, the description above in relation to the air flap, in particular relating to the slotted guide, also applies mutatis mutandis to the actuator with the slotted guide.

The description above in respect of the system, in respect of the vehicle front and in respect of the vehicle also applies mutatis mutandis to the actuator with the slotted guide, and vice versa.

It is also contemplated that, in addition or as an alternative, the driver on the air flap is of resilient configuration.

In the following text, one embodiment will be described with reference to FIGS. 1 to 3.

DETAILED DESCRIPTION OF THE DRAWINGS

Figure 1:
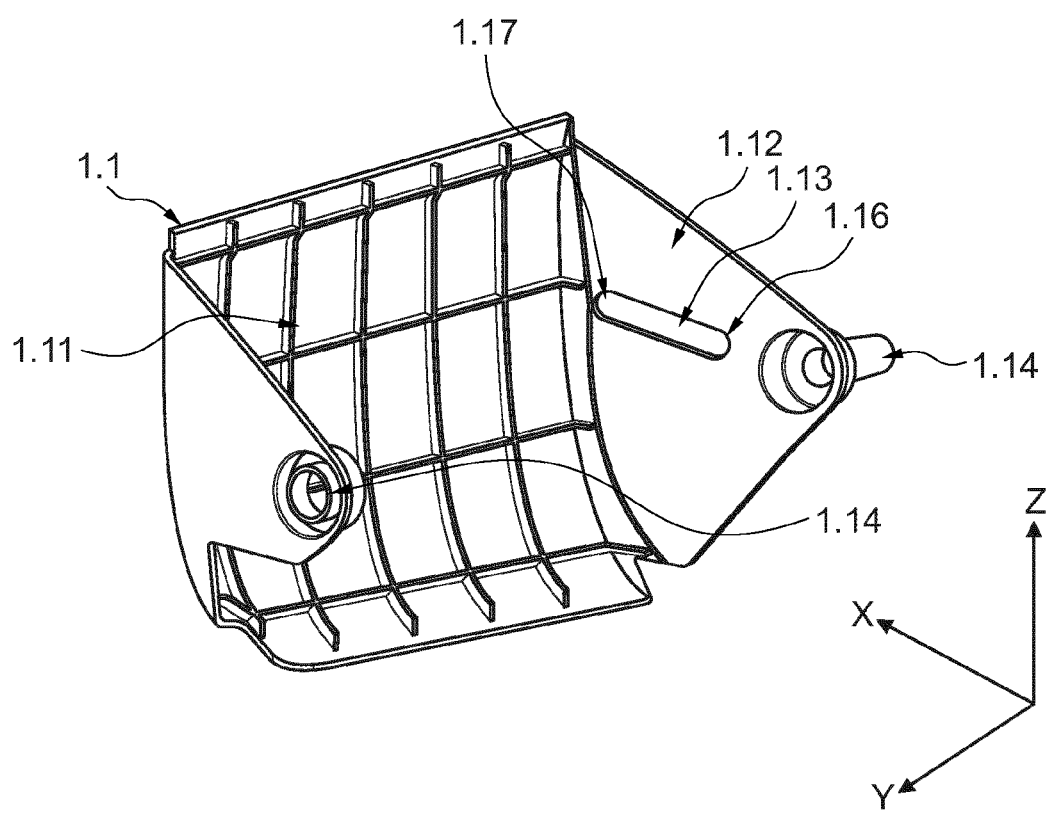
FIG. 1 is a diagrammatic perspective view of a conventional air flap.
Figure 2:
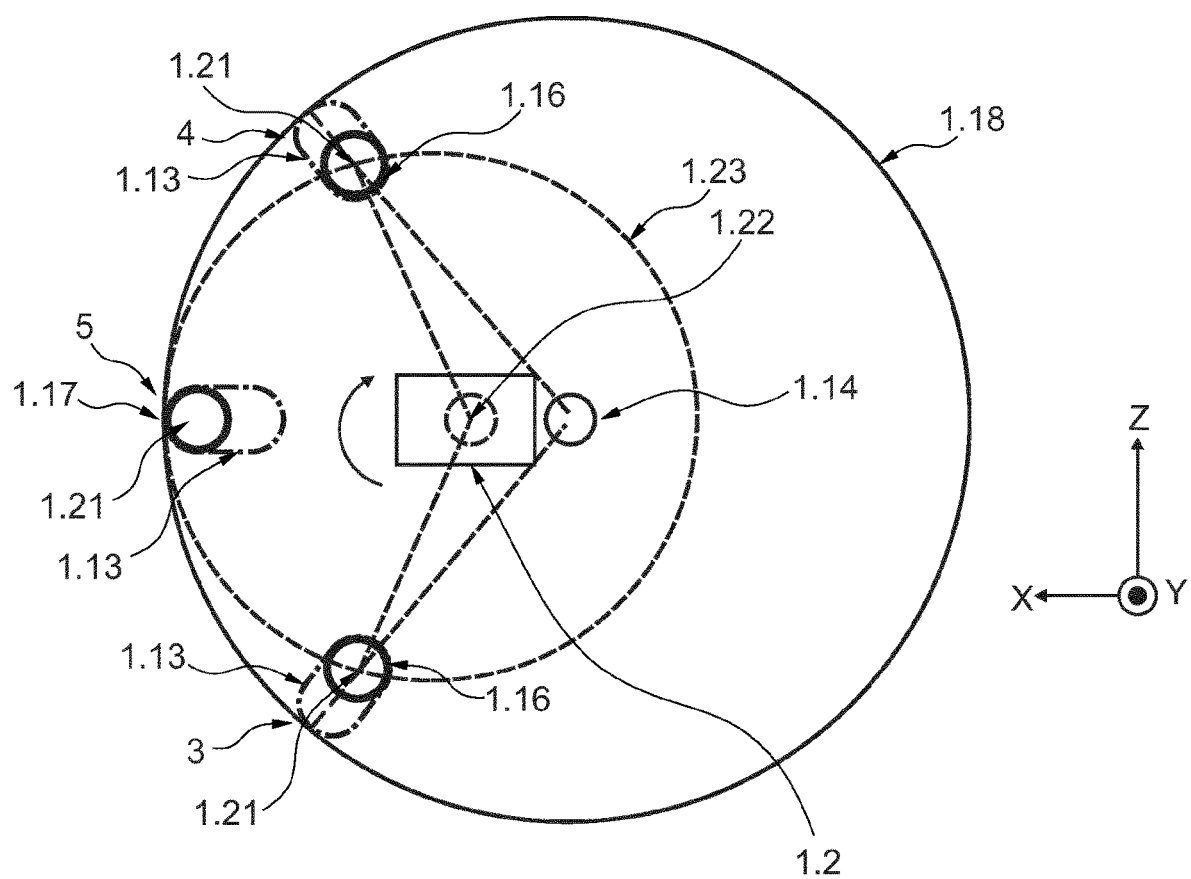
FIG. 2 is an outline sketch to clarify a movement path of the air flap from FIG. 1 and a driver of an actuator during an adjustment from a closed into an open position.

FIG. 1 shows a perspective view of a conventional air flap 1.1. FIG. 2 shows an outline sketch to clarify a movement path of the air flap 1.1 from FIG. 1 and a conventional driver 1.21 of an actuator 1.2 during an adjustment of the air flap 1.1 from a closed into an open position.

Furthermore, FIGS. 1 and 2 show a Cartesian coordinate system, X specifying the vehicle longitudinal direction, Y specifying the vehicle width direction and Z specifying the vehicle vertical direction.

The air flap 1.1 which is shown in FIG. 1 has a front surface 1.11 and a side surface 1.12 with a slotted guide 1.13.

The air flap 1.1 blocks an air inlet of the vehicle front (not shown) by way of the front surface 1.11 in the closed position, and releases the air inlet in an open position.

To this end, as indicated by way of the arrow in FIG. 2, the air flap 1.1 is rotated upward in the vehicle vertical direction Z from the closed position 3 into the open position 4 by way of a rotational movement about the rotational axis 1.14 of the air flap 1.1 running in the vehicle width direction Y by means of a driver 1.21 of an actuator 1.2, which driver 1.21 can be guided in the slotted guide 1.13.

Here, a pivot point or a pivot pin 1.22, running in the vehicle width direction Y, of the actuator 1.2 is arranged further to the front in the vehicle longitudinal direction X relative to a pivot point or the pivot pin 1.14 of the front flap 1.1, with the result that a tighter or smaller turning radius 1.23 results for the driver 1.21 which is connected to the pivot pin 1.22 of the actuator 1.2 than for the air flap 1.1 which has the turning radius 1.18.

It is therefore necessary for the slotted guide 1.13 to be provided in the side surface 1.12 of the air flap 1.1, which slotted guide 1.13 compensates for the length difference of the two turning radii 1.18, 1.23 of different size, that is to say makes a movement of the driver 1.21 relative to the side surface 1.12 possible in the case of the rotational movement of the air flap 1.1.

In other words, the air flap 1.1 is actuated by way of a driver 1.21 of the actuator 1.2, in particular having an actuating motor. In order to reduce torques on the actuator 1.2 or for it not to be necessary for the drive of the air flap 1.1 to be set congruently with the pivot pin 1.22 of the actuator 1.2, a slotted guide 1.13 is used on the lever arm of the actuator 1.2 or, as is currently the case, on the flap side, in order to produce an equalization for angular or positional deviation of the two pins 1.14, 1.22.

Here, the slotted guide 1.13 for fixing the driver 1.21 has a first end stop 1.16 for the driver 1.21 at one end, in which the driver 1.21 is arranged in the closed and the open position 3, 4.

Furthermore, the slotted guide 1.13 for fixing the driver 1.21 has a second end stop 1.17 for the driver 1.21 at its other end, in which the driver 1.21 is arranged in a position 5, in which the air flap 1.1 is substantially half open.

On account of the arrangement of the pivot pins 1.22 and 1.14 relative to one another, the second end stop 1.17 for the driver 1.21 is arranged further away from the pivot pin 1.14 than the first end stop 1.16.

As described at the outset, however, it is necessary in the case of modern vehicles for an air flap to also be moved into intermediate positions, that is to say positions between the closed and the open position, in which a driver is not fixed on an end stop of a slotted guide, and for it to be possible for the air flap to be held there.

In an intermediate position of this type, undesired vibrations of the air flap 1.1 often occur in the case of conventional air flaps, such as the air flap 1.1 shown in FIG. 1, due to flow and as a result of the tolerance range of the bearing systems of the air flap 1.1 in the air flap controller.

Figure 3:
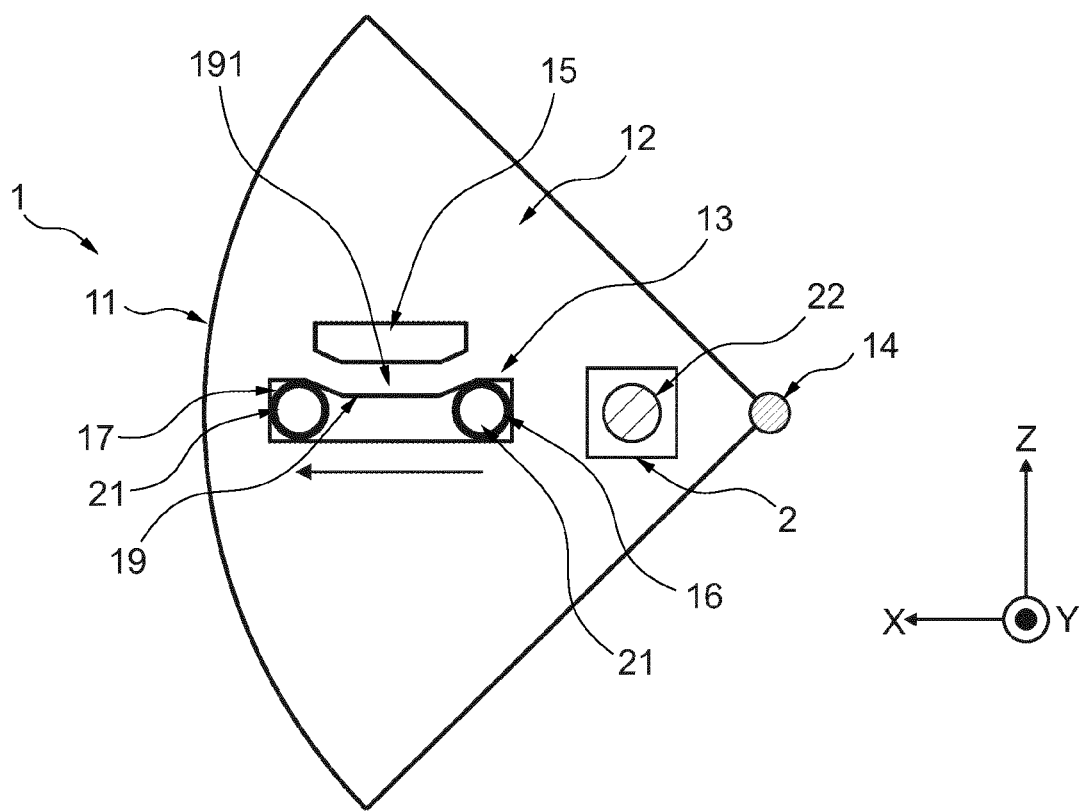
FIG. 3 is a diagrammatic side view of an air flap according to an embodiment of the invention.

In order to avoid this, the invention proposes an air flap 1 which is shown in FIG. 3. FIG. 3 shows the air flap 1 according to the invention in accordance with the embodiment in a diagrammatic side view.

Furthermore, as also in FIGS. 1 and 2, FIG. 3 shows a Cartesian coordinate system, X specifying the vehicle longitudinal direction, Y specifying the vehicle width direction and Z specifying the vehicle vertical direction.

The air flap 1 has a front surface 11 and a side surface 12 with a slotted guide 13 which is arranged on the side surface 12.

The air flap 1 blocks an air inlet of the vehicle front by way of the front surface 11 in a closed position 3 (see FIG. 2), and releases the air inlet in an open position 4 (see FIG. 2).

By way of a rotational movement about a pivot pin 14 which is configured at a rear end (in the vehicle longitudinal direction X) of the paddle-shaped air flap 1, the air flap 1 can be rotated from the closed position 3 into the open position 4 by means of a driver 21 of an actuator 2, which driver 21 can be guided in the slotted guide 13.

To this extent, the construction of the air flap 1 according to the invention corresponds to the construction described above with reference to FIGS. 1 and 2 of the conventional air flap 1.1.

In contrast to the conventional air flap 1.1, however, the air flap according to the invention has a tapered portion 19. In the present case, the slotted guide 13 which is arranged on the side surface 12 of the air flap 1 has the tapered portion 19.

Here, the tapered portion 19 is dimensioned and designed in such a way that the slotted guide 13 and the driver 21 have substantially no play with respect to one another in the region of the tapered portion 19.

More precisely, the side surface 12 of the air flap 1 is of resilient configuration in the region of the tapered portion 19.

To this end, the side surface 12 of the air flap 1 has a recess 15 in the region of the tapered portion 19, above the tapered portion 19 here, with the result that the side surface 12 of the air flap 1 is of resilient configuration in the region of the tapered portion 19. A wall 191 is configured between the tapered portion 19 and the recess 15.

The pivot pin 14 of the air flap 1 runs substantially in the vehicle width direction Y. The rotational movement, in order to move the air flap 1 from the closed into the open position 3, 4, corresponds to a rotational movement described above with reference to FIG. 2 and in the present case comprises a rotation of the air flap 1 upward in the vehicle vertical direction Z about the pivot pin 14 which runs in the vehicle width direction Y.

In a closed position 3, the driver 21 of the actuator 2 is situated in a first end stop 16 for the driver 21 which is arranged in a region which adjoins the tapered portion 19 in the vehicle longitudinal direction X.

As described above with reference to FIG. 2, the driver 21 of the actuator 2 then migrates or slides in the slotted guide 13 on account of the turning radii 1.18 and 1.23 of different size during a rotational movement for adjusting the air flap 1 from the closed into the open position 3, 4.

First of all, as indicated by way of the arrow in FIG. 3, the driver 21 moves from the first end stop 16 in the direction of a second end stop 17 which is configured at an opposite end of the slotted guide 13, that is to say the second end stop 17 for the driver 21 is arranged further away from the pivot pin 14 than the first end stop 16, and the tapered portion 19 extends from the first to the second end stop 16, 17.

For the movement to the second end stop 17, the driver 21 has to pass the tapered portion 19. The tapered portion 19 which, as described above, extends from the first to the second end stop 16, 17 is of resilient configuration in the present case as likewise described above.

Therefore, the driver 21 which is of rigid configuration here can move or press away the wall 191, configured between the tapered portion 19 and the recess 15, in the direction of the recess 15.

The wall 191 in turn presses the driver 21 against an inner wall, lying opposite it, of the slotted guide 13. In this way, the driver is fixed and the actuator 2 can stop the rotational movement and can thus hold the air flap 1 in the intermediate position, without undesired vibrations occurring.

In other words, in the intermediate position of the air flap 1, the driver 21 is situated in that region of the tapered portion 19 of the slotted guide 13, in which the driver 21 and the slotted guide 13 have substantially no play with respect to one another.

If the air flap 1 is rotated further, the driver 21 reaches the second stop 17 and is therefore situated in a second region which adjoins the tapered portion 19 and in which the driver 21 is arranged in a position 5 (see FIG. 2), in which the air flap 1 is substantially half open.

If the air flap 1 is again rotated further, the driver 21 again reaches the first stop 16 after again passing the tapered portion 19, and is therefore situated in the first region which adjoins the tapered portion 19 and in which the driver 21 is arranged in the open position 4.

In addition or as an alternative, it is conceivable that the actuator 2 has a driver 21 which is of resilient configuration. In the way described above, the driver 21 can then be supported on the inner walls of the slotted guide 13.

The slotted guide has been described above as configured on the air flap side. It is also conceivable, however, that the slotted guide is provided on the actuator side, and the air flap has a driver 21 in an analogous manner with respect to the above-described actuator 2.

That is to say, an actuator 2 for an air flap 1 of an air flap arrangement of the vehicle front can also be provided, which actuator 2 can be connected to the air flap 1 by means of a connecting element which has a slotted guide.

A driver which is arranged on the air flap 1 can be guided in the actuator-side slotted guide. More precisely, the air flap 1 also has a front surface 11 and a side surface 12 here. Instead of the air flap-side slotted guide 13, a driver is then fixed or arranged on the side surface 12 of the air flap 1, however.

The air flap 1 blocks an air inlet of the vehicle front by way of the front surface 11 in the closed position, and it releases the air inlet in an open position 4.

The air flap 1 can then be rotated in the above-described way from the closed position 4 into the open position 3 by way of a rotational movement about the above-described pivot pin 14.

Since the slotted guide which is arranged on the connecting element of the actuator 2 has a tapered portion just like the above-described air flap-side slotted guide, the actuator-side slotted guide and the air flap-side driver have substantially no play with respect to one another in the region of the tapered portion.

In this way, the same advantages as described above with reference to the air flap 1 can be achieved. The further design possibilities are the same as described above with reference to the air flap 1, with the result that reference is made to the above text.

List of Designations

1; 1.1 Air flap
11; 1.11 Front surface
12; 1.12 Side surface 13; 1.13 Slotted guide
14; 1.14 Pivot pin, air flap
15 Recess
16; 1.16 First end stop
17; 1.17 Second end stop
18; 1.18 Turning radius, air flap
2; 1.2 Actuator
21; 1.21 Driver
22; 1.22 Pivot pin, actuator
23; 1.23 Turning radius, actuator
19 Tapered portion
191 Wall
5 Position, in which the air flap is half open
X Vehicle longitudinal direction
Y Vehicle width direction
Z Vehicle vertical direction

The invention claimed is:

1. A component of an air flap arrangement of a vehicle front, comprising: an air flap having a front surface and a side surface with a slotted guide, wherein the air flap blocks an air inlet of the vehicle front by way of the front surface in a closed position and releases the air inlet in an open position, the air flap is rotatable from the closed position into the open position by way of a rotational movement about a pivot pin via a driver of an actuator, which driver is guidable in the slotted guide, and the slotted guide, which is arranged on the side surface of the air flap, has a tapered middle portion, such that the slotted guide and the driver have substantially no play with respect to one another in a region of the tapered middle portion.

2. The component according to claim 1, wherein the side surface of the air flap has a resilient configuration in the region of the tapered portion.

3. The component according to claim 2, wherein the side surface of the air flap has a recess in the region of the tapered portion, to provide the side surface of the air flap with the resilient configuration in the region of the tapered portion.

4. The component according to claim 1, wherein the slotted guide has a first end stop for the driver in a first region which adjoins the tapered portion and in which the driver is arrangeable in the closed position and the open position.

5. The component according to claim 4, wherein the slotted guide has a second end stop for the driver in a second region which adjoins the tapered portion and in which the driver is arrangeable in a position in which the air flap is substantially half open.

6. The component according to claim 5, wherein the second end stop for the driver is arranged further away from the pivot pin than the first end stop, and the tapered portion extends from the first to the second end stop.

7. The component according to claim 1, wherein the pivot pin runs substantially in a vehicle width direction.

8. The component according to claim 7, wherein the rotational movement, in order to move the air flap from the closed into the open position, comprises a rotation of the air flap upward in a vehicle vertical direction about the pivot pin which runs in the vehicle width direction.

9. An actuator for an air flap, comprising: a driver configured to be guided in a slotted guide, having a tapered middle portion, arranged on a side surface of an air flap that blocks an air inlet of a vehicle front, wherein the driver has a resilient configuration so as to elastically deform when passing through the tapered middle portion.

10. A system, comprising: an actuator; and an air flap having a front surface and a side surface with a slotted guide, wherein the air flap blocks an air inlet of a vehicle front by way of the front surface in a closed position and releases the air inlet in an open position, the air flap is rotatable from the closed position into the open position by way of a rotational movement about a pivot pin via a driver of the actuator, which driver is guided in the slotted guide, and the slotted guide, which is arranged on the side surface of the air flap, has a tapered middle portion, such that the slotted guide and the driver have substantially no play with respect to one another in a region of the tapered middle portion, wherein the actuator is configured to rotate the air flap from the closed position into the open position and into at least one intermediate position of the air flap situated between the closed and the open position by way of the rotational movement about the pivot pin of the air flap via the driver which is guided in the slotted guide, and the driver is situated in the at least one intermediate position of the air flap in that region of the tapered middle portion of the slotted guide, in which the driver and the slotted guide have substantially no play with respect to one another.

11. An actuator for an air flap arrangement of a vehicle front, comprising: an air flap having a front surface and a side surface, the side surface being driven with a driver, wherein the air flap blocks an air inlet of the vehicle front by way of the front surface in a closed position and releases the air inlet in an open position, wherein the actuator is to be connected to the air flap by way of a connecting element with a slotted guide, in which the driver is guidable, in such a way that the air flap is rotatable from the closed position into the open position by way of a rotational movement about a pivot pin, and wherein the slotted guide, which is arranged on the connecting element of the actuator, has a tapered middle portion such that the slotted guide and the driver have substantially no play with respect to one another in the region of the tapered middle portion.

* * * * *